United States Patent Office 3,284,309
Patented Nov. 8, 1966

3,284,309
NUCLEAR POWER GENERATING APPARATUS
Eger V. Murphree, Summit, N.J., assignor to the United States of America as represented by the United States Atomic Energy Commission
Filed July 27, 1943, Ser. No. 496,373
1 Claim. (Cl. 176—45)

The present invention relates to a method and apparatus for producing power by the decomposition of uranium atoms and more specifically for the production of power by the atomic fissioning of $U^{235}$. The invention will be fully understood from the following description.

Figure 1:
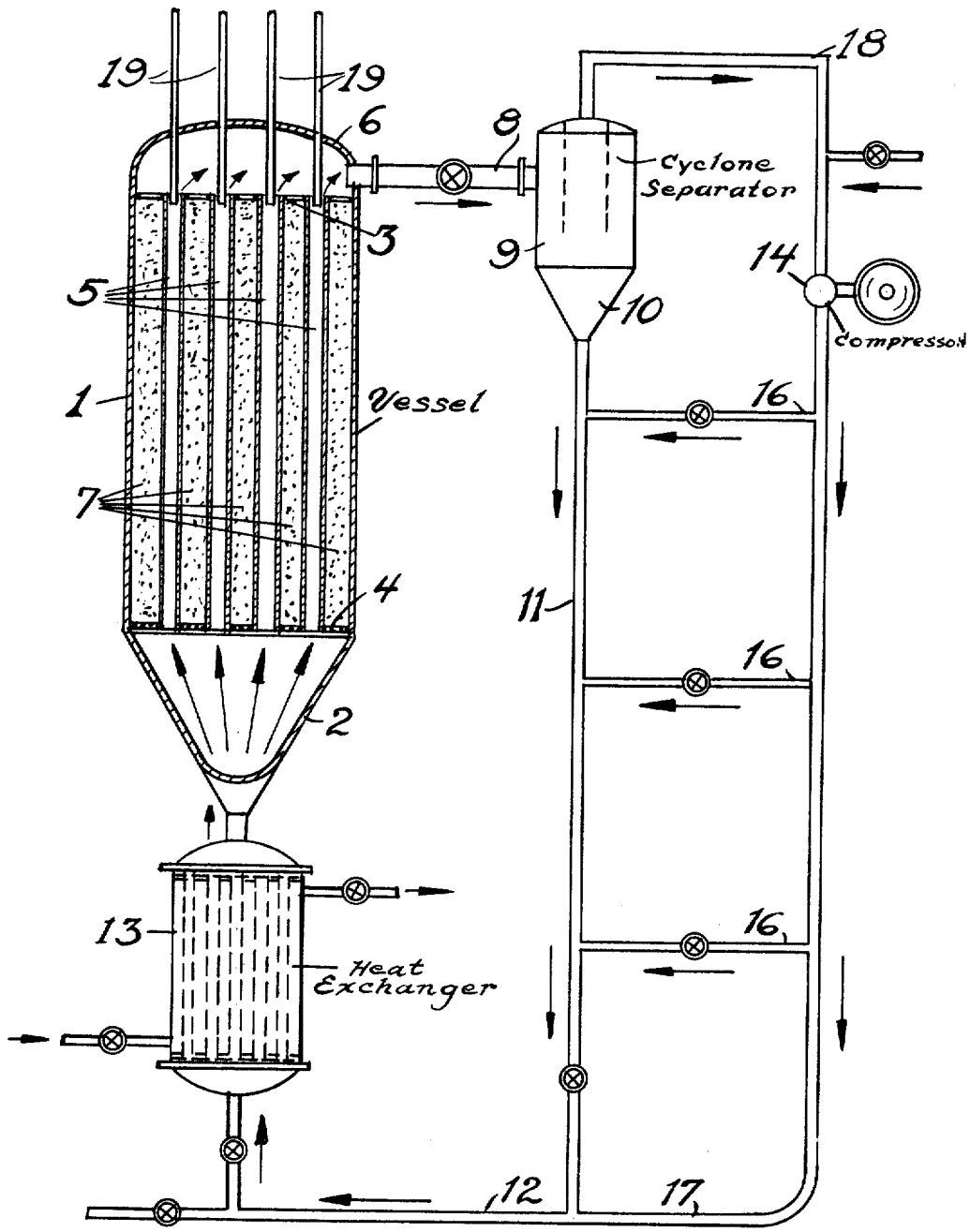
Figure 2:
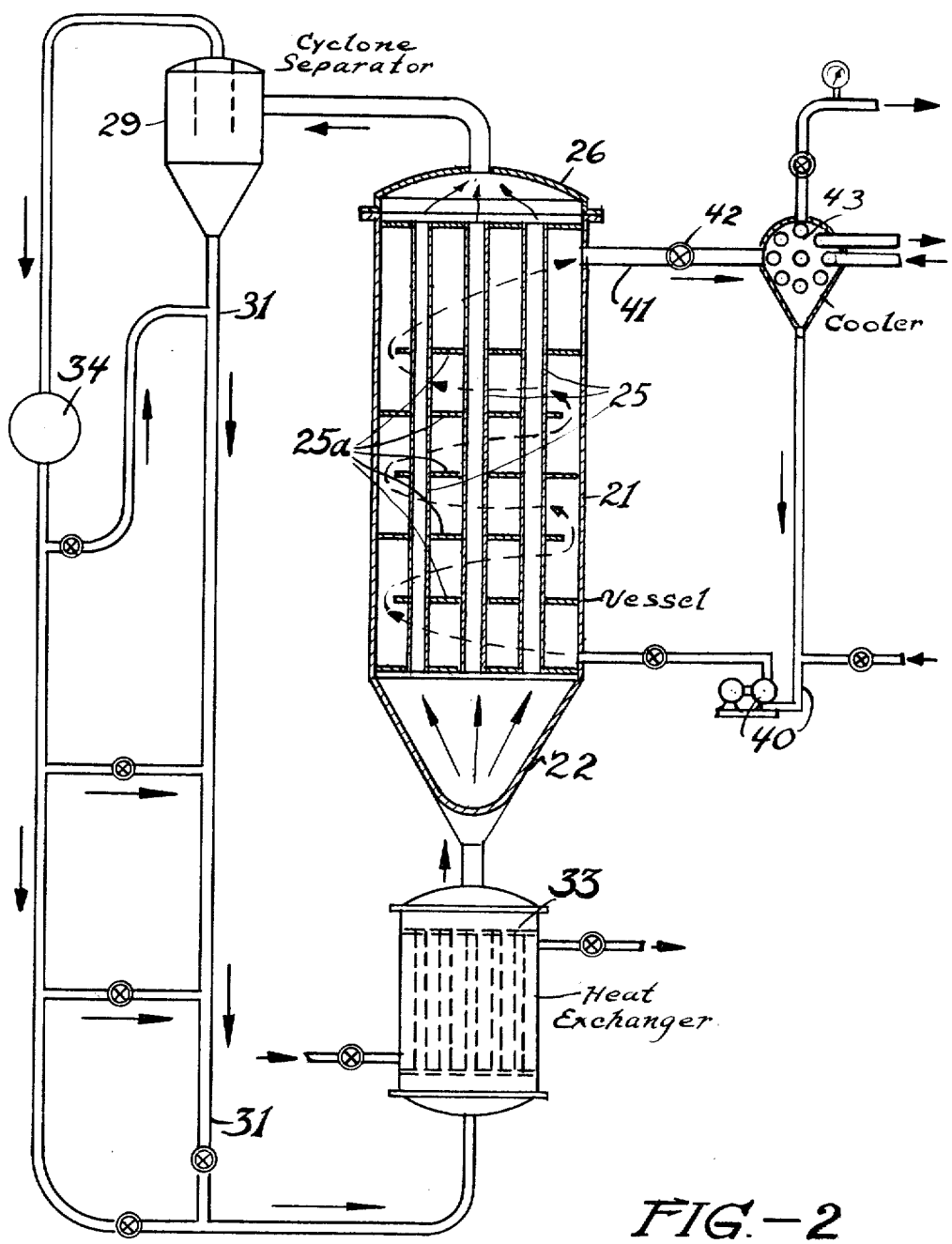

FIG. 1 of the drawing is an apparatus shown in diagrammatic form in sectional elevation, designed to carry out the purpose of the present invention, and FIG. 2 is a modified apparatus for the same purpose.

Figure 3:
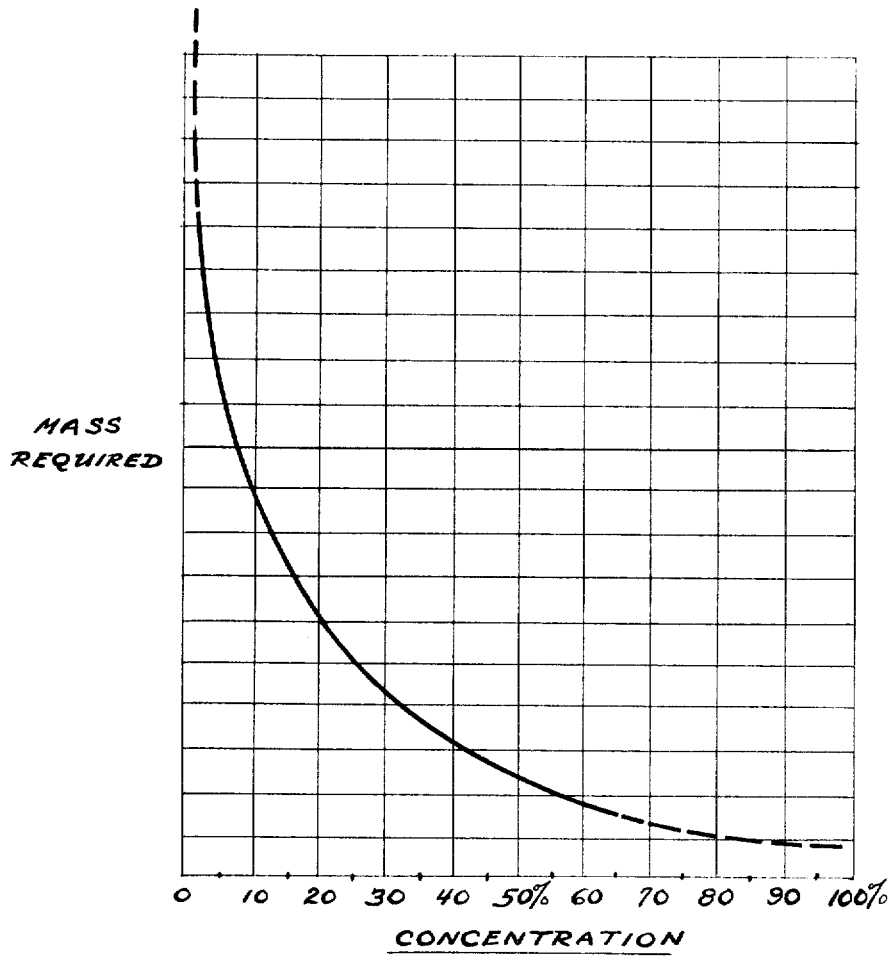

FIG. 3 shows a curve illustrating the relation between the required mass of the uranium undergoing fissioning and the concentration of the active isotope therein.

One of the three uranium isotopes, $U^{235}$, is capable of undergoing a nuclear decomposition known as fissioning by the action of neutrons of thermal energy level. While the exact nature of the process is not known with complete certainty, it is known that when an atom of $U^{235}$ is struck by a neutron, the nuclear reaction takes place, giving rise to various elements, a release of energy and the release of a greater number of neutrons than were required to initiate the reaction. Thus it will be understood that a chain reaction is possible, if the larger number of neutrons are employed gainfully in causing further fissioning of the active uranium.

It has been found that neutrons are readily absorbed by many substances and unless particular conditions are maintained, the neutrons set free are rapidly absorbed. The chain reaction will continue indefinitely, that is to say as long as $U^{235}$ is present and the number of neutrons is in balance. If for some reason the absorption of the neutrons is increased, they will gradually be removed and the chain reaction will cease.

From what has been said before, it will be understood that in order to maintain the reaction, it is necessary that an excess of neutrons must be produced over those used in the reaction and those absorbed uselessly by materials that may be present. Neutron absorbing substances will naturally always be present in, for example, metal walls, in the active uranium isotopes and in other materials and it has been found necessary to surround the decomposing uranium with a damping layer of a very low neutron absorbing substance. Non-useful neutron absorption of this type occurs to a greater degree in the inactive uranium isotopes, particularly $U^{238}$ relative to useful absorption with high speed neutrons than neutrons having a speed corresponding to the thermal level. This higher ratio of useful neutron absorption results from the fact that the absorption cross-section of the $U^{235}$ to produce fission rises a great deal more than does the simple capture cross-section of $U^{238}$, for neutrons of thermal energy. Since the capture of neutrons in $U^{238}$ constitutes a loss to the system, it is apparent that the use of the slowing medium becomes essential for producing a divergent chain reaction with natural uranium or uranium enriched with the isotope $U^{235}$ but having a predominant $U^{238}$ content. It is therefore desirable that neutrons can readily escape from the uranium mass where they are produced and allowed to pass into a surrounding neutron damping or slowing medium of very low neutron absorbing capacity. In this medium the high speed secondary neutrons produced by fissioning are slowed down to thermal levels by collisions and can then flow back to the same or other uranium masses with greatly reduced danger of non-useful absorption to maintain the chain reaction. It will be understood that there are no truly non-neutron absorbing substances but some materials, which will be disclosed later, show a comparatively low absorption power for neutrons and such materials may be used as the damping layer. On the other hand, there are other materials of a very high absorbing quality and the presence of such materials must be avoided insofar as possible in order to maintain the reaction. When the shielding layer of the material of low absorption power is present, a large proportion of the neutrons produced by fissioning is returned for further reaction and when the layer is absent, a large portion of the neutrons is dissipated by absorption in non-reactive materials and thus lost. It is thus possible to maintain the reaction by surrounding the decomposing uranium with a suitable shielding layer of low neutron absorbing substance and the reaction may be brought to a stop either by withdrawing the said layer or by substituting therefor a substance of high neutron absorbing power or by introducing materials of high absorption power within the reaction zone.

While it has been suggested heretofore that a divergent chain reaction might be obtained provided a sufficient quantity of the isotope $U^{235}$ could be separated from natural uranium, an important feature of the present invention resides in the discovery of certain advantages or desirable effects that may be obtained in a self-sustaining chain nuclear fission neutron reactor by utilizing a concentration of $U^{235}$ in the uranium substance employed. In natural uranium, the proportion of $U^{235}$ is approximately one part of 140 by weight, the greater part of the remainder being $U^{238}$ with a minor proportion of $U^{234}$. These other isotopes are capable of absorbing slow neutrons without fissioning so that in effect they are neutron absorbing substances and it will be understood that the concentration of $U^{235}$ is of the greatest significance. One cannot state exactly the proper or minimum concentration of $U^{235}$ required for maintaining the general fissioning because the reaction depends on the quantity or mass of material undergoing reaction, on the presence of neutron absorbing substances and on the presence or absence of a surrounding layer of a substance of low neutron absorbing power and other factors as well. It has been appreciated that in order to obtain the chain reaction with naturally occurring uranium, an enormous mass would be required under a given set of conditions and the power produced could be enormous also. A difficult problem has been presented therefore for the production of power on a relatively small scale. In general, it may be stated that under any set of conditions the mass or quantity of uranium which will undergo general fission involved in a divergent chain reaction decreases rapidly with increase in the concentration of the active isotope. One of the important features of the present invention lies in the use of uranium material of $U^{235}$ content above the concentration naturally occurring, which, as indicated, makes it possible to utilize the reactor for power production on a relatively small scale, although as noted above, the invention is not necessarily limited to use of enriched uranium since if a large size and mass of reactor are tolerable, natural uranium may be used.

Other features of the present invention relate to the particular apparatus by which the chain reaction may be employed for the generation of power and means for controlling the reaction.

Referring to the drawing, FIG. 1, numeral 1, denotes a reaction vessel in the form of a vertical cylinder with a conical bottom 2 and upper and lower cross sectional plates 3 and 4 between which straight vertical tubes 5 are connected so as to provide a free passage from the conical bottom 2 through the tubes into an outlet chamber 6 at the top of the reaction vessel. The space between the tubes and the shell 1 is filled with carbon or graphite which serves as a slowing medium for the neutrons and as a reflector as well, since it fills all the spaces between the tubes 5 and extends beyond and around the tubes, and surrounds the inner walls of the metallic vessel 1. In practice this graphite may be packed down firmly into a dense mass. This is indicated generally by the numeral 7. From the outer chambers 6 at the top of the reaction vessel a duct 8 is connected with a dust separator 9, which is of the usual cyclone type, but it will be understood that other types may be employed if desired. The separator is fitted with a conical base 10 in which separated powdery material may be collected and fed to a standpipe 11, which is provided to carry the powder through a horizontal transfer pipe 12 and thence upwardly through a heat exchanger or cooler 13 and finally again into the conical base of the reactor. Dust or powdered material can thus be passed in a cyclic path upwardly through the carbon surrounded tubes in the reaction vessel 1, into the separator and thence through the pipes 11 and 12 to the cooler 13 and again into the reactor 1 by way of the conical base. The powdery material in this cycle is maintained in what is described as a "fluidized" condition and is maintained throughout in this condition in which it is capable of flowing round and round as indicated.

In order to maintain a finely divided material in the fluidized condition, a small amount of gas is added to the finely divided powder. For this purpose helium is preferred but the other indifferent gases may be used, such as nitrogen, methane, rare gases and the like, and it is forced by pump 14 through a manifold pipe from which it is fed in relatively small quantities to the standpipe by the valved pipe 16 and in considerably larger volume to the transfer pipe 12, preferably at its discharge end, by the connecting pipe 17. A large part of the helium or other gas is drawn off the dust separator 9 by a pipe 18 and is returned to the pump 14. It will thus be seen that where there is a continuous circuit for the powdered material in the fluidized condition, there is likewise a closed circuit for the carrying gas.

To make clear the operation of the apparatus disclosed above, it will be understood that natural uranium or its oxide, or uranium that has been enriched with the active isotope $U^{235}$, is reduced to a fine powder and is maintained in a fluidized condition throughout the apparatus. The fluidized stream is circulated upwardly through the reactor 1 into the separator, down the tube 11, through the transfer line 12 and upward again into the reactor by way of the cooler 13 and the conical bottom of the reactor 2. On entering the reaction zone the powdered uranium material is aggregated into separate and spaced masses each being almost completely surrounded by the layer of carbon which has extremely low neutron absorbing quality. Under these conditions the fissioning reaction becomes rapid along with a concomitant heat evolution; the hot powder is withdrawn from the reaction vessel and the fissioning reaction gradually diminishes as soon as it passes out of the range of influence of the carbon shield. The fluidized stream of hot powder passes upwardly through the coller 13 and the heat is withdrawn by a circulating cooling medium. From this heat power can be generated in any desirable manner. In the drawing the gas separator is shown receiving the material directly from the reactor, but it will be understood that if desired the cooler could be placed in the line 8 and the withdrawal of gas could be effected after the cooling if desired. If it is desired to slow the reaction or to stop it, the circulation of the powder can be stopped by cutting off the flow of powder, maintaining gas flow to blow the uranium powder out of the tubes. On the other hand, it can also be stopped or slowed down by introducing highly absorbing material into the reaction zone or damping medium. Rods 19 may be used for this purpose. They are preferably made of material rich in boron which has an exceptionally high neutron absorbing power and may be lowered into the vertical tubes of the reaction vessel. The absorption of the neutrons by the boron can thus decrease or stop the reaction as desired.

Referring to FIG. 2, the apparatus illustrated is quite similar to that shown above except that it is designed for the use of liquid slowing and reflecting layers instead of carbon as employed in FIG. 1. The reaction vessel 21 is fitted with the tubes 25, just as in the previous drawing, but the space around the tubes serves for the circulation of a liquid neutron slowing and shielding material preferably heavy water. Baffles 25a may be placed in the reaction vessel to assist the circulation of the liquid. As before, the fluidized powder passes into the conical base 22, upwardly through the tubes 25 and into the discharge space 26; thence it will pass to the separator 29, the standpipe 31 and returns to the reactor 21 by way of the heat exchanger 33.

Helium is employed as before to effect the fluidization of the powdered uranium and the gas is circulated by means of the pump 34 and supplied to the various points in the apparatus where it is required to maintain the uranium in fluidized condition and to effect the circulation of the fluidized stream. As indicated before, no carbon is used in the present reactor, but instead a stream of heavy water is circulated through the reactor around the tubes and is thus out of direct contact with the uranium. The heavy water is circulated by the pump 40 and is withdrawn by pipe 41. It is preferable to provide a valve 42 in the outlet pipe 41 so that a positive pressure may be held on the circulating heavy water to prevent its vaporization within the reactor. On reducing pressure at the valve 42, the heated water flashes into steam which is conducted to condenser 43 and the condensate is returned to pump 40 by the pipe 44. The cooling medium for the condenser absorbs a part of the heat produced in the reactor 21 and this heat may be used for power production or for other purposes.

In the operation of the present process, the quantity of uranium employed within the reactor at any one time must be adjusted and correlated with the concentration of the active isotope, $U^{235}$, as well as with the quality of the surrounding layer of the material of low absorption power. It is difficult to give an exact figure because of the complexity of the process and the many factors involved, but the quantitative effects of these factors can be readily understood. FIG. 3 shows a relation between the mass of the uranium and the concentration of the active isotope therein for chain fissioning. The figure shows that when large amounts of uranium are present, a relatively low concentration of enrichment in respect to $U^{235}$ can be employed, but if the uranium is to be used in a smaller quantity, greater concentration or enrichment in respect to the active isotope must be obtained in order to insure the chain fissioning. It will be understood that this curve will be shifted upwardly or downwardly depending on the various other factors indicated above, but the concentration of the active isotope probably should in no case exceed about 50% of the total uranium under any conditions where power production is in view.

The preferred uranium material is, of course metallic uranium but its oxides $UO_2$ and $U_3O_8$ can also be used and where the term "uranium" has been used herein, it will be understood that it is employed to mean either the metal or the oxide thereof. While divergent or self-sustaining chain reactions can be carried out with uranium in the form of massive blocks or lumps which are maintained in a stationary spaced position in the neutron slowing medium, the removal of the heat from the chain reaction system can be greatly simplified and the power production process can be made more effective by practicing the present invention wherein it is preferred that the uranium should be reduced to a fine powder in which condition it can be circulated as described above.

Among the damping materials which have been described above as materials of low neutron absorbing power may be included ordinary water, which should be rated as only fair, carbon, which is good, highly purified carbon or graphite, which may be described as very good, and heavy water which is the best known substance. Uranium is substantially surrounded during the fissioning process by a bulk or layer of one or the other of these materials. The thickness of the particular layer depends on several factors, but in general it may be stated that the layer should be from 3 to 10 inches in thickness which gives the best balance between desired slowing down of neutrons to thermal velocities without opportunity for contact with uranium bodies while at energy levels relatively more favorable for capture in $U^{238}$ and minimum loss as non-useful absorption in the slowing medium.

In the process as described above, the uranium or its oxide is caused to flow in a finely divided or fluidized condition through the power generation zone where it is surrounded by the non-neutron absorbing layer. Under the influence of the layer, chain fissioning will rapidly begin, causing the generation of heat by which the uranium is raised in temperature. When passing out of the reaction zone and thus out of the influence of the absorbing layer, the reaction subsides and the heat generated is absorbed for the power producing purposes. Where carbon is used as the absorbing layer, the carbon will, of course, become heated but the bulk of the heat penerated in the process is separated from the powdered uranium. In the second case illustrated, where heavy water is employed, as the neutron slowing medium and reflecting as shielding layer, heat will be absorbed by the heavy water and it is desirable to extract heat not only from the fluidized uranium but from the heavy water layer as well.

In order to fluidize the uranium or the oxide, it is reduced to a fine powder, finer than 50 mesh and preferably of the order of 100 or 200 mesh. A relatively small amount of gas is added to the powder in order to cause it to fluidize, in other words, to bring it into the form of a dense suspension of a powder in a gas. Such fluidized material is capable of flowing through tubes, ducts, valves and the like, much like a liquid, and flowing streams of the fluidized material exhibit static and dynamic heads. While only a small amount of gas is necessary to bring the powdered material into the fluidized condition, additional gas may be added and the principal effect throughout is merely to reduce the density of the suspension. Circulating of the powdered material is effected without the use of pumps or fans which operate on the powder containing material by making use of the addition of gas which has as its principal effect, the reduction in density of the fluidized material. Thus, referring to FIG. 1, the column of fluidized material in the pipe 11 is greater in density than the corresponding column represented by the tube in exchanger 13 and the reaction vessel 1 because of the relatively large amount of gas added at the discharge end of pipe 12. The amount of gas thus is sufficient to cause a substantial difference in density of the two columns, which in turn generates the pressure necessary to cause the circulation.

It is necessary to maintain the powdered material in fluidized form throughout the entire cycle. When the dust is separated in the separator 9 of FIG. 1 or 29 of FIG. 2, it drops into the bottom of the separator as a very dense, but still fluidized, form, and gas is added along the standpipe 11 or 31 in FIGS. 1 and 2 respectively, in order to maintain a fluidized condition in the standpipe. Thus the circulation can be effected merely by the withdrawal of the gas from the top of the separator and the addition to the transfer line.

I claim:

An apparatus for the generation of power comprising, a nuclear reaction vessel containing a plurality of spaced substantially vertical tubes for the passage of a fluidized mixture of an inert gas and finely divided enriched uranium in an amount sufficient to maintain a nuclear chain reaction, said tubes surrounded by $D_2O$ neutron slowing and heat exchange liquid, a gas-solid separator adapted to separate the enriched uranium from the inert gas, a first exchanger for extracting heat energy from the fluidized mixture, means for circulating the fluidized mixture in a cyclic path including the reaction vessel, separator and first heat exchanger, a second heat exchanger for extracting heat energy from the $D_2O$ neutron slowing and heat exchanger liquid, and means for circulating the $D_2O$ liquid in a cyclic path including the reaction vessel and the second heat exchanger.

References Cited by the Examiner

UNITED STATES PATENTS

| | | | |
|---|---|---|---|
| 2,206,634 | 7/1940 | Fermi et al. | 204—154 |
| 2,287,619 | 6/1942 | Kallmann et al. | 204—154 |

FOREIGN PATENTS

| | | |
|---|---|---|
| 114,150 | 5/1940 | Australia. |
| 114,151 | 5/1940 | Australia. |
| 460,374 | 5/1928 | Germany. |
| 440,023 | 12/1935 | Great Britain. |

OTHER REFERENCES

Chemical Abstracts, 1940, page 7734.
General Electric Review, June 1940, page 229.
Journal Applied Physics, 1939, pages 612–614.
Nature, May 13, 1939, page 793.
Naturwissenschaften, 1939, pages 402–410.
Physical Review, Jan. 15, 1939, pages 150–153 and March 15, 1940, page 546.
Power, July 1940, pages 56–59.
Roberts, "Uranium and Atomic Power," J. App. Physics, vol. 10, pp. 612–614 (1939).
Smyth Report on "Atomic Energy for Military Purposes," August, 1945, pp. 22, 68 and 69.
Goodman, "The Science and Engineering of Nuclear Power," vol. 1, page 275, Addison-Wesley Press, Inc. (1947).

REUBEN EPSTEIN, *Primary Examiner.*

SAM COCKERILL, *Examiner.*

JAMES L. BREWRINK, *Assistant Examiner.*